United States Patent

Kuribayashi et al.

[11] Patent Number: 5,788,246
[45] Date of Patent: Aug. 4, 1998

[54] SEAL DEVICE FOR PISTON ROD

[75] Inventors: Morio Kuribayashi; Toshiei Ihara, both of Kashiwazaki, Japan

[73] Assignee: Kabushiki Kaisha Riken, Tokyo, Japan

[21] Appl. No.: 725,659

[22] Filed: Oct. 1, 1996

[30] Foreign Application Priority Data

Dec. 8, 1995 [JP] Japan .................... 7-345065

[51] Int. Cl.$^6$ .................................................. F16J 9/20
[52] U.S. Cl. .................................................. 277/163
[58] Field of Search .................... 277/139, 140, 277/141, 163, 215, 216

[56] References Cited

U.S. PATENT DOCUMENTS

| 2,452,503 | 10/1948 | Teetor | 277/163 |
| 2,848,288 | 8/1958 | Johnson | 277/163 |
| 3,467,397 | 9/1969 | Sugahara | 277/163 |
| 4,161,321 | 7/1979 | Hendrixon et al. | 277/163 |
| 4,497,497 | 2/1985 | Berti et al. | 277/163 |
| 4,522,412 | 6/1985 | Kubo | 277/138 |
| 5,295,696 | 3/1994 | Harayama et al. | 277/139 |

FOREIGN PATENT DOCUMENTS

| 113098 | 5/1899 | Germany | 277/163 |
| 1-35055 | 2/1989 | Japan | 277/163 |
| 527 208 | 10/1940 | United Kingdom. |
| 995 683 | 6/1965 | United Kingdom. |
| 1 099 235 | 1/1968 | United Kingdom. |
| 1 349 510 | 4/1974 | United Kingdom. |
| 2 013 829 | 8/1979 | United Kingdom. |
| 2 147 958 | 5/1985 | United Kingdom. |

OTHER PUBLICATIONS

"Machine Design; Seals, 3rd ed."; Penton Publ.; p. 23, Mar. 1967.
"Industrial Sealing Technology"; H.Hugo Buchter; John Wiley & Sons; pp. 380–381, Nov. 1979.
"Engineer's Piston Ring Handbook"; 4th ed.; Koppers Company; pp. 90–91, 1939.

*Primary Examiner*—Scott Cummings
*Attorney, Agent, or Firm*—Kubovcik & Kubovcik

[57] ABSTRACT

A piston seal device has a combined oil scraping ring that includes a steel annular oil scraping ring body having an M-, I- or H-shaped cross section, and an annular coil spring. The ring body has a cross-sectional cut at one location and includes an upper rail member, a lower rail member and a strut holding the upper and lower rail members and having an annular groove in its outer circumferential side, the annular groove having a number of circumferentially spaced oil holes. The annular coil spring is fitted into the annular groove in a stretched state for urging the strut diametrically inward toward the piston rod, whereby the inner circumferential surfaces of the upper and lower rail members are brought into pressured contact with the outer peripheral surface of the piston rod owing to the constraining force of the spring. The oil scraping ring contacts the outer peripheral surface of the piston rod while flexing to follow up the shape of the surface, thereby improving the oil sealing effect.

1 Claim, 7 Drawing Sheets

SEAL DEVICE FOR PISTON ROD

BACKGROUND OF THE INVENTION

1. Field of the Invention

This invention relates to a rod seal device for effecting sealing about a shaft which undergoes reciprocating motion in the axial direction. More particularly, the invention relates to a seal device for a piston rod used in a large-size two-cycle diesel engine or the like for seagoing vessels.

2. Description of the Prior Art

In a large-size two-cycle diesel engine for ships, generally a partitioning wall is provided between the scavenging chamber and crank chamber of the engine and a piston rod reciprocates through a stuffing box provided in the partitioning wall to accommodate a rod seal device.

The rod seal device accommodated in the stuffing box generally has an air-tight ring in the upper portion thereof, namely on the side of the scavenging chamber, for the purpose of maintaining the air-tightness of the scavenging chamber. An oil scraping ring is attached to the lower portion of the rod seal device, namely on the side of the crank chamber, for the purpose of obstructing the outflow of lubricating oil from the crank chamber to the scavenging chamber as the piston rod reciprocates.

The oil scraping ring comprises a combination of ring segments which, as shown in A of FIG. 9, are obtained by dividing a ring into a plurality (three in the illustration) of segments in the diametric direction, and a combination of ring segments which, as shown in B of FIG. 9, are obtained by dividing a ring into three segments in the tangential direction. These two types of rings, designated at a and b, each have a coil spring disposed about their outer circumference and are superimposed, as illustrated in C of FIG. 9. The superimposed rings a, b are fitted into a ring groove, as illustrated in FIG. 10. The inner peripheral surface of the oil scraping ring is brought into pressured contact with the outer peripheral surface of a piston rod by the constraining force of the coil springs, whereby the ring functions as means for preventing the excessive consumption of lubricating oil by scraping off lubricating oil that attaches itself to the surface of the piston rod and attempts to migrate into the scavenging chamber when the piston rod reciprocates.

Conventional oil scraping rings of this type used in a piston rod seal device include one in which a circumferential groove is provided in the circumferential surface that contacts the outer surface of the piston rod. Small holes are provided extending diametrically from the groove to function as means for facilitating the removal and discharge of the lubricating oil that has been scraped off.

These conventional oil scraping rings are made of high-grade cast iron, low-phosphorous cast iron, copper alloy or resin material and a number of stages thereof are installed in the manner shown in the sectional view of FIG. 10.

The conventional split ring is urged inward by the constraining force of the annular coil spring disposed on the other circumferential side thereof, and the inner circumferential surface of each ring segment is brought into sliding contact with the outer peripheral surface of the piston rod, thereby performing the function of scraping the lubricating oil from the outer peripheral surface of the piston rod. In case of a conventional oil scraping ring made of cast iron or copper alloy, each ring element constructing the split ring is fabricated in the form of a block having a high rigidity. Consequently, if there is a difference between the curvature of the inner circumference of each ring segment and the curvature of the outer circumference of the piston rod, the ring segments will be incapable of deforming to follow up the outer peripheral surface of the piston rod regardless of the action of the constraining force applied by the annular coil spring. This means that the inner circumferential surface of each ring segment will be incapable of contacting the outer peripheral surface of the piston rod over the entirety of the segment circumference, as a result of which a gap will form between the surface of the piston rod and the inner circumferential surface of the ring segment. In addition, owing to local sliding contact between the piston rod and the ring segment, the outer peripheral surface of the piston rod sustains scratches and eccentric wear and, as a result, some lubricating oil is not scraped off. Thus, it is difficult to achieve a satisfactory oil scraping performance.

Furthermore, in case of the conventional oil scraping ring made of copper alloy, which is a comparatively soft material, the ring soon sustains to match the outer peripheral shape of the piston rod sliding against it, whereby a sliding surface conforming to the outer peripheral surface of the piston rod is formed at a comparatively early time. This is advantageous in that comparatively good air-tightness is obtained. As wear proceeds, however, the area of contact between the sliding surfaces of the ring and rod grows so that there is a decline in contact surface pressure per unit of contact area. The problem that results is hampered oil scraping function and, hence, an increase in oil consumption.

Various expedients for solving the aforesaid problems of the oil scraping rings made of cast iron or copper alloy have been proposed. For example, it has been proposed to use a high-precision manufactured article obtained by applying a straightening heat treatment at the fabrication stage and corrective machining for eliminating deformation caused by internal stresses after initial machining. Further, it has been proposed that the actual opposing parts be fitted together at installation of the oil scraping ring to match the dimensions of these opposing parts.

However, these expedients entail added labor and lead to an increase in expenditures. If the cylindrical shape of the piston rod is irregular, using a high-precision article (oil scraping ring) or fitting the actual parts together will not solve the aforementioned problems.

In the case where a resin such as ethylene tetrafluoride is used as the material for the oil scraping ring, the inner periphery of the ring quickly accommodates itself to the outer peripheral surface of the piston rod owing to the low rigidity of this material. Accordingly, an excellent oil scraping performance can be achieved initially. With extended use, however, the resin material absorbs the lubricating oil, softens as a result and sustains increased wear. It soon becomes necessary to replace parts, thus requiring a difficult operation and added expense.

SUMMARY OF THE INVENTION

Accordingly, an object of the present invention is to provide a piston rod seal device which exhibits an excellent oil scraping performance by contacting the outer peripheral surface of the piston rod while following up the shape of this surface to reduce the consumption of lubricating oil consumed as the piston rod moves.

According to the present invention, the foregoing object is attained by providing a seal device for an engine piston rod, the seal device comprising a combined oil scraping ring comprising (a) an annular oil scraping ring body consisting of steel having a cross-sectional cut at one location and including an upper rail member, a lower rail member and a strut holding the upper and lower rail members and having an annular groove in an outer circumferential side thereof, the annular groove having a number of oil holes spaced apart in the circumferential direction, the oil scraping ring body having an M-, I- or H-shaped cross section, and (b) an annular coil spring fitted into the annular groove in a stretched state for urging the strut diametrically inward, whereby inner circumferential surfaces of the upper and lower rail members are brought into pressured contact with an outer peripheral surface of the piston rod.

In the present invention, it is desirable to improve a durability of an oil scraping ring wherein a wear-resistant layer is formed on a sliding portion of the oil scraping ring with the nitride treatments such as soft nitride, ion nitride, gas nitride and the like, plating treatments such as Cr-plating and Ni-P composite diffusion plating, and CVD and PVD treatments.

Also it is possible to further improve a early running property by forming a surface layer with $Fe_3O_4$, a parkerizing and Sn-plating treatments.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The present invention will now be described on the basis of the illustrated embodiments. It should be noted that these embodiments are for elucidating the invention and in no way limit the scope thereof.

Figure 1:
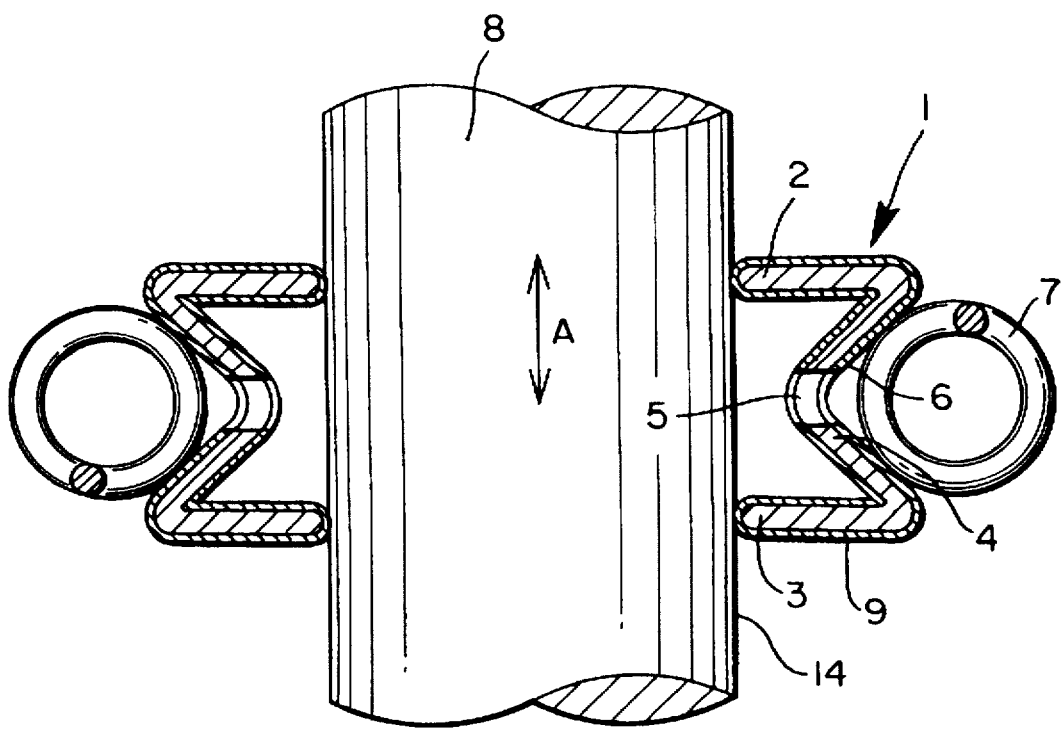
FIG. 1 is a partial sectional view illustrating an oil scraping ring in the installed state in a first embodiment of the invention.
Figure 3:
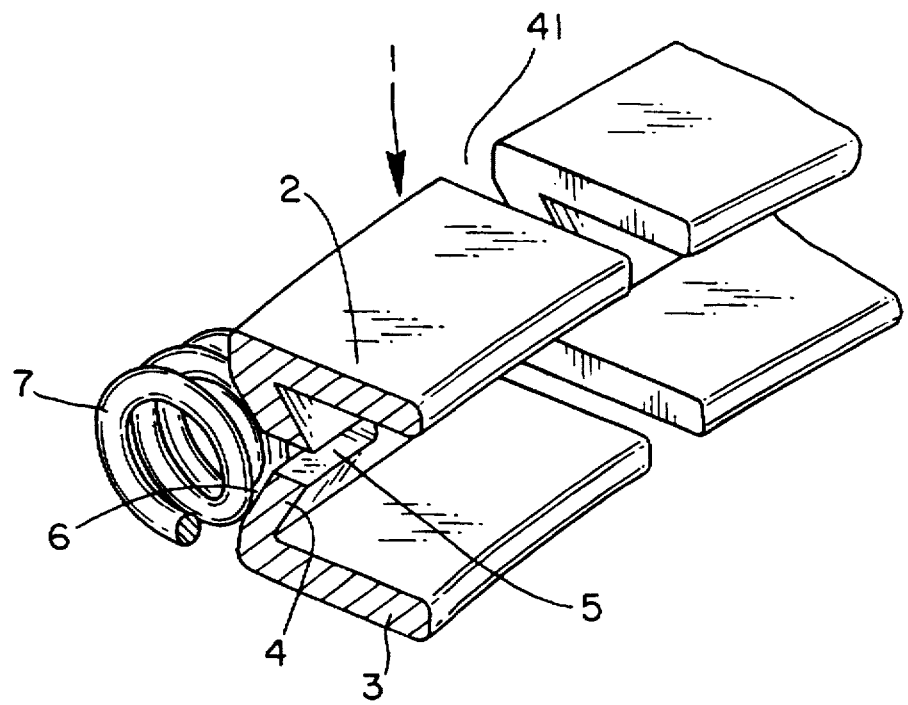
FIG. 3 is a partial perspective view illustrating the oil scraping ring of the first embodiment.

FIG. 1 is a partial sectional view illustrating the structure of an oil scraping ring 1 according to a first embodiment of the invention. The oil scraping ring 1 is shown fitted on a piston rod 8, which is reciprocated in the direction of arrow A, so as to grasp the piston rod 8 from its outer side. FIG. 3 is a partial perspective view of the oil scraping ring according to this embodiment.

The oil scraping ring 1 is obtained by integrally connecting an upper rail member 2 and a lower rail member 3 by a strut 4. The strut 4 has an annular valley 6 on its outer circumferential side and a number of oil flow holes 5 formed in the valley 6 and spaced apart in the circumferential direction. A stretched annular coil spring 7 is fitted into the valley 6 so as not to interfere with the oil flow holes 5, i.e., in such a manner that the spring 7 is in abutting contact with the inclined surfaces defining the valley 6 so that the oil flow holes 5 will not be blocked.

The oil scraping ring body, which comprises the upper and lower rail members 2, 3 and the strut 4, has a generally M-shaped cross section overall and is integrally constructed by rolling thin steel strips into an annular shape, which has a cross-sectional cut 41 at one location, by molding rolls.

The annular coil spring 7 urges the strut 4 diametrically inward toward the piston rod 8 by the constraining force thereof so that the inner circumferential edges of the upper and lower rail members 2, 3 are brought into pressured contact with the outer peripheral surface 14 of the piston rod 8. This assures that oil will be scraped off the peripheral surface of the piston rod effectively.

Since the oil scraping ring body of this embodiment is integrally molded from thin steel strips so as to assume a generally M-shaped cross section, the ring body exhibits flexibility. As a result, the inner circumferential edges of the upper and lower rail members 2, 3 readily follow up and remain in contact with the outer peripheral surface of the piston rod over their entire circumferences owing to the constraining force of the annular coil spring 7. This affords excellent oil scraping performance from the start. In addition, since the upper and lower rail members have a thin plate-shaped configuration, there is no increase in contact area even when wear progresses. This assures that excellent oil scraping performance will be maintained over an extended period of time.

Numeral 9 denotes a surface treatment layer effective in enhancing the durability of the oil scraping ring or in improving the initial conformity to the piston rod.

Figure 2:
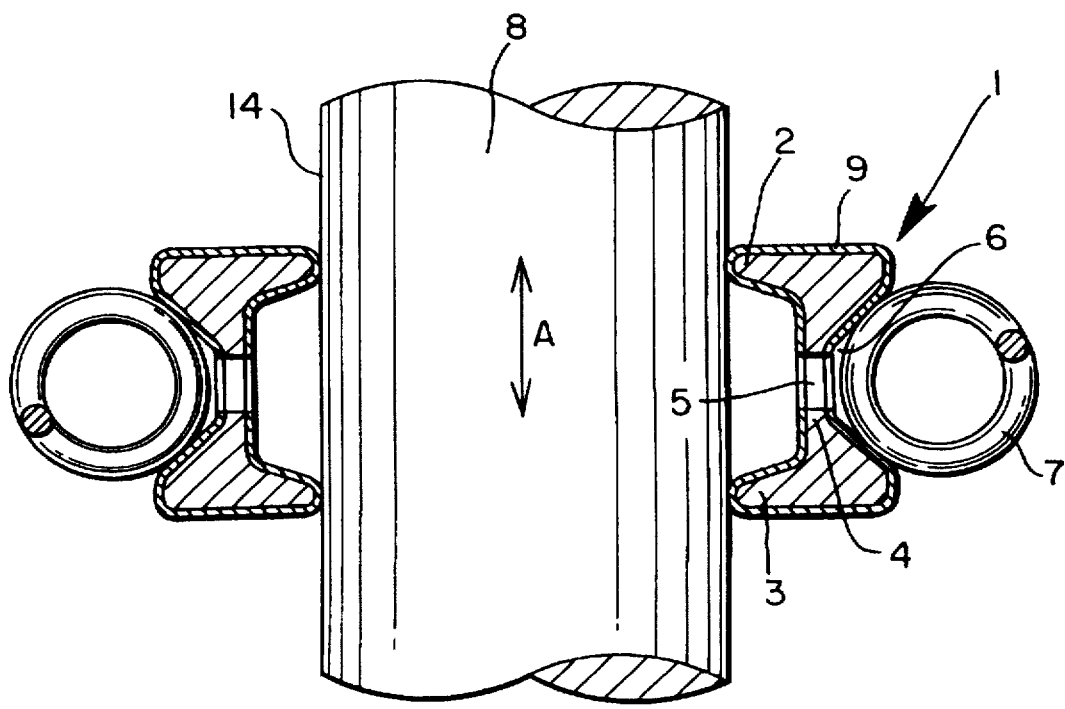
FIG. 2 is a partial sectional view illustrating an oil scraping ring in the installed state in a second embodiment of the invention.

FIG. 2 is a sectional view illustrating the structure of the oil-scraping ring 1 according to a second embodiment of the invention. This view corresponds to that of FIG. 1.

In this embodiment also the oil scraping ring 1 is obtained by integrally connecting the upper rail member 2 and the lower rail member 3 by the strut 4. The strut 4 has the annular valley 6 on its outer circumferential side and a number of oil flow holes 5 formed in the valley 6 and spaced apart in the circumferential direction. The retched annular coil spring 7 is fitted into the valley 6.

The oil scraping ring body, which comprises the upper and lower rail members 2, 3 and the strut 4, has a generally I- or H-shaped cross section overall and can be integrally molded by molding shaped-section wire material, which has been drawn into a prescribed I- or H-shaped configuration, into an annular shape, which has a cross-sectional cut at one location, by coil machining.

The annular coil spring 7 urges the strut 4 diametrically inward toward the piston rod 8 by the constraining force thereof so that the inner circumferential edges of the upper and lower rail members 2, 3 are brought into pressured contact with the outer peripheral surface of the piston rod 8. This assures that oil will be scraped off the peripheral surface of the piston rod effectively.

Since the upper and lower rail members as well as the strut portion of the oil scraping ring are integrally molded so as to define a generally I- or H-shaped cross section, the ring body exhibits flexibility in this embodiment as well. As a result, the inner circumferential edges of the upper and lower rail members 2, 3 readily follow up and remain in contact with the outer peripheral surface of the piston rod over their entire circumferences owing to the constraining force of the annular coil spring 7. This affords excellent oil scraping performance from the start. In addition, since the upper and lower rail members have a thin plate-shaped configuration, there is no increase in contact area even when wear progresses. This assures that excellent oil scraping performance will be maintained over an extended period of time.

Figure 4:
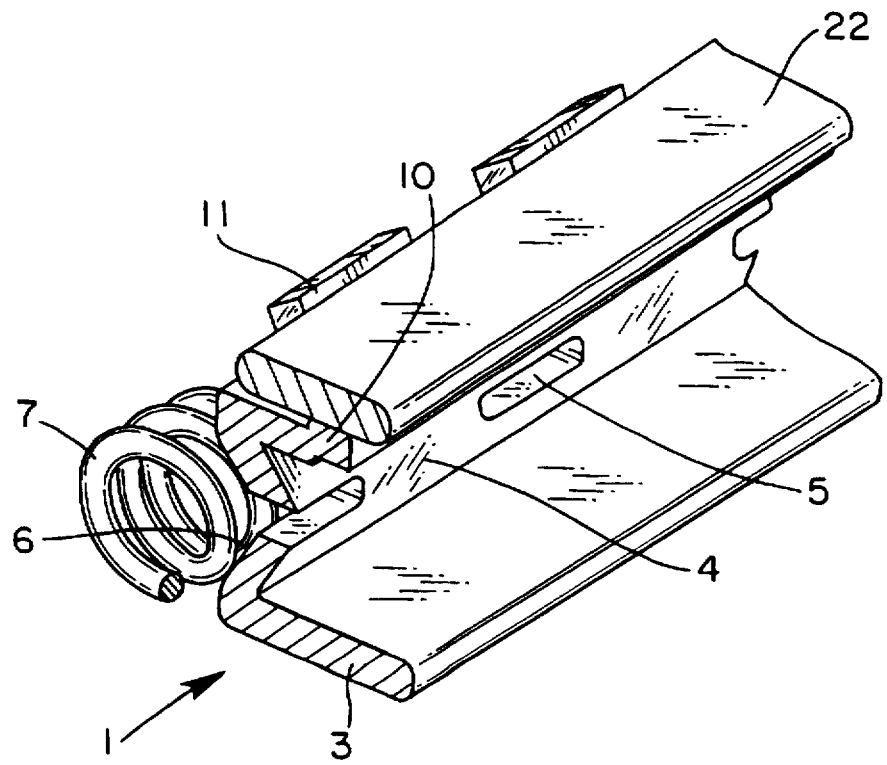
FIG. 4 is a partial perspective view illustrating the oil scraping ring of a third embodiment of the invention.

FIG. 4 is a partial perspective view illustrating the structure of the oil-scraping ring 1 according to a third embodiment of the invention. The oil scraping ring is obtained by integrally molding the lower rail member 3 and the strut 4. An upper rail member 22 is molded as a separate body, namely as an annular side rail 22, and has abutting ends and exhibits no tension of its own. The annular side rail 22 is supported by a side rail support portion formed on the upper part of the strut 4 and is thus held by the strut.

Figure 5:
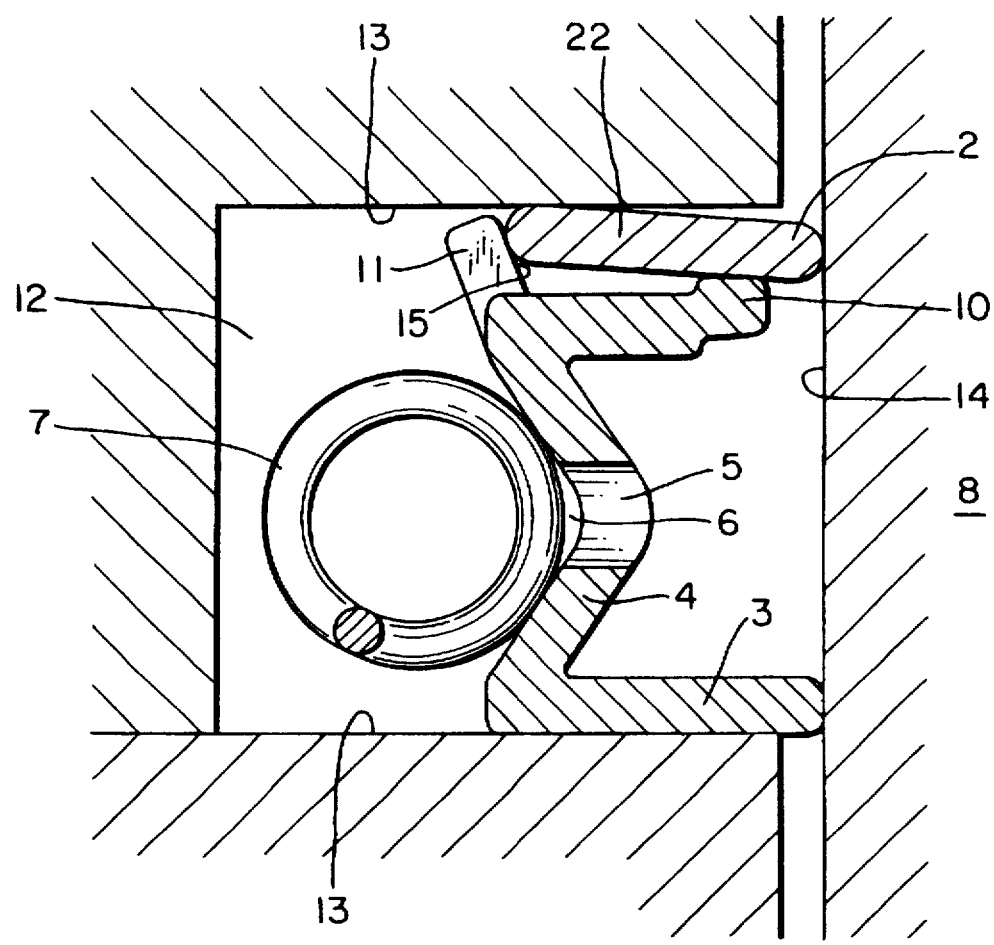
FIG. 5 is a partial sectional view illustrating an oil scraping ring in the installed state in a third embodiment of the invention.

As shown in FIG. 5 illustrating the oil scraping ring fitted onto the piston rod 8, the side rail support portion has a supporting projection 10 for supporting the side rail 22 by contacting it from the lower side at a position near its inner circumferential portion, and a lug 11 for urging the side rail 22 toward its inner circumferential portion by contacting the outer circumferential edge of the side rail 22. The constraining force of the annular coil spring 7 acts upon the side rail 22 via the lug 11 so that the inner circumferential edge of the side rail 22 is brought into pressured sliding contact with the outer peripheral surface 14 of the piston rod 8. At the same time, the inner circumferential edge of the lower rail member 3 also slides on the outer peripheral surface of the piston rod 8 while in pressured contact with it.

The lug 11 has a surface 15 which is in abutting contact with the side rail 22. It is preferred that the surface 15 be formed so as to slant diametrically outward to a slight extent. The inclined surface 15 of the lug 11 urges the side rail 22 toward its inner circumference so that the inner circumferential edge of the rail 22 is forced into contact with the outer peripheral surface 14 of the piston rod 8. At the same time, the inclined surface 15 lifts the outer circumferential portion of the side rail 22 in the axial direction so that the rails 22, 3 are brought into abutting contact with wall surfaces 13 of a ring groove 12, thereby improving the seal (the side surface seal) between the oil scraping ring and the wall surfaces.

Little effect is obtained if the angle of inclination of the inclined surface 15 of lug 11 is less than 5°, as measured from the direction of the piston rod axis. If the angle of inclination is made more than 40°, on the other hand, the contact pressure between the side wall 13 of the ring groove and the rail 22 becomes too large. This produces too much frictional force, as a result of which the rail 22 is less able to follow up the outer peripheral surface of the piston rod. According to the present invention, therefore, the angle of inclination preferably is set to a range of 10° to 25°. The side rail support portion, the strut 6 and the lower rail 3 are manufactured as a unitary body by subjecting a steel strip to punching work and molding by molding rolls.

Figure 6:
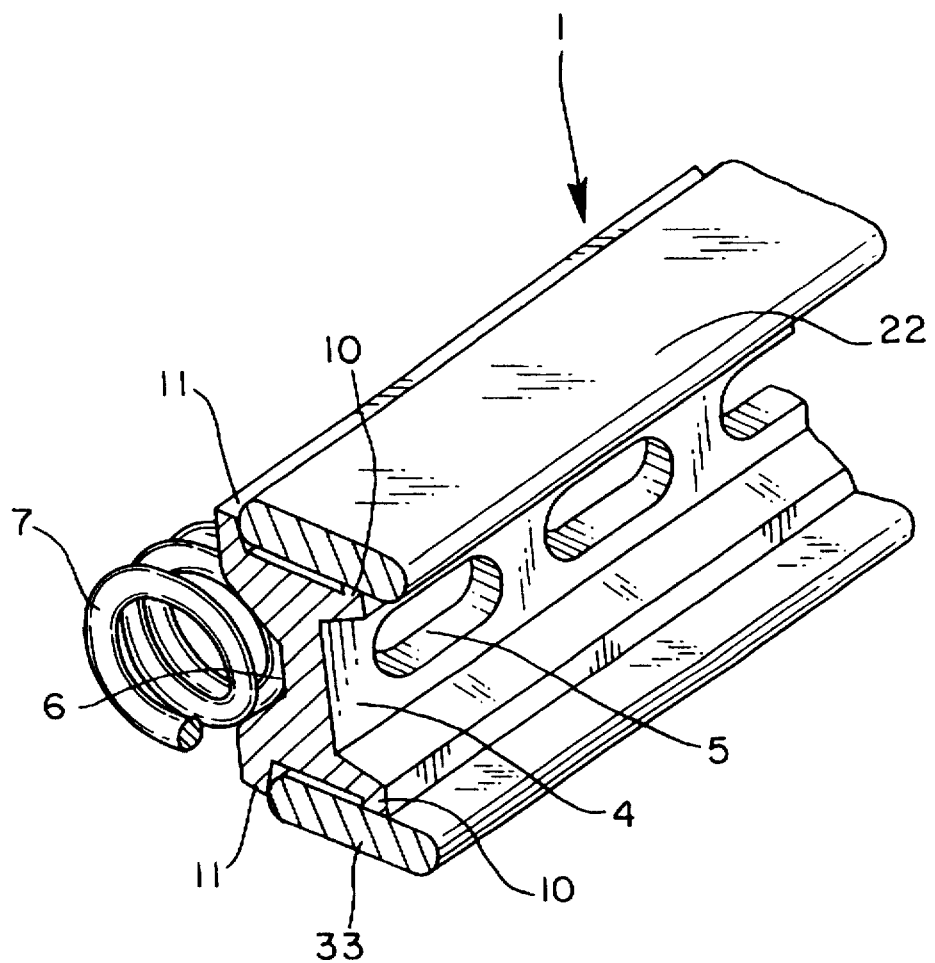
FIG. 6 is a partial perspective view illustrating the oil scraping ring of a fourth embodiment of the invention.

FIG. 6 is a partial perspective view illustrating the structure of the oil-scraping ring 1 according to a fourth embodiment of the invention. The oil scraping ring 1 according to this embodiment includes the upper rail member and the lower rail member molded as separate bodies, namely as annular side rails 22 and 33 each having abutting ends and exhibiting no tension of their own. The strut 4 is formed to have side rail support portions each having the supporting projection 10 and lug 11 in a manner similar to that of the third embodiment. The rail support portions support respective ones of the annular side rails 22 and 33.

The strut 4 and its side rail support portions define a generally I- or H-shaped cross section overall and can be molded as a unitary body by molding shaped-section wire material, which has been drawn into a prescribed I- or H-shaped configuration, into an annular shape, which has a cross-sectional cut at one location, by coil machining.

The annular coil spring 7 urges the strut 4 diametrically inward toward the piston rod 8 by the constraining force thereof so that the inner circumferential edges of the upper and lower rail members 22, 33 are brought into pressured contact with the outer peripheral surface of the piston rod 8. This assures that oil will be scraped off the peripheral surface of the piston rod effectively.

Since the upper and lower rail members as well as the strut portion of the oil scraping ring are integrally molded so as to define a generally I- or H-shaped cross section, the ring body exhibits flexibility in the fourth embodiment as well. As a result, the inner circumferential edges of the upper and lower rail members 22, 33 readily follow up and remain in contact with the outer peripheral surface of the piston rod over their entire circumferences owing to the constraining force of the annular coil spring 7. This affords excellent oil scraping performance from an early stage. In addition, since the upper and lower rail members have a thin plate-shaped configuration, there is no increase in contact area even when wear progresses. This assures that excellent oil scraping performance will be maintained over an extended period of time.

Figure 7:
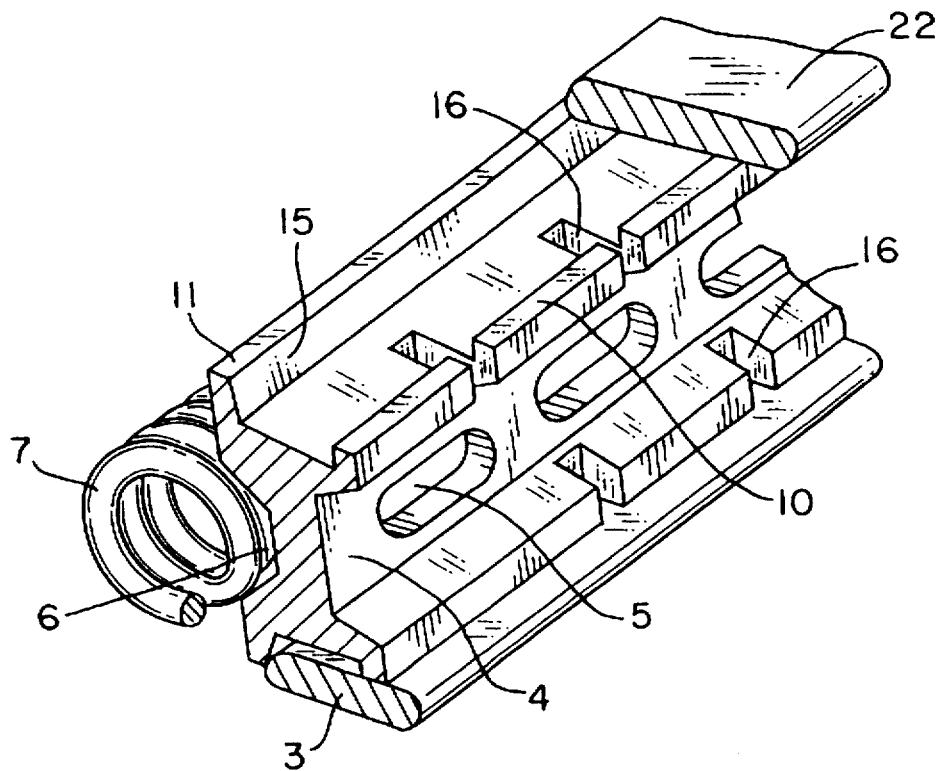
FIG. 7 is a partial sectional view illustrating a modification of the oil scraping ring according to the fourth embodiment.
Figure 8:
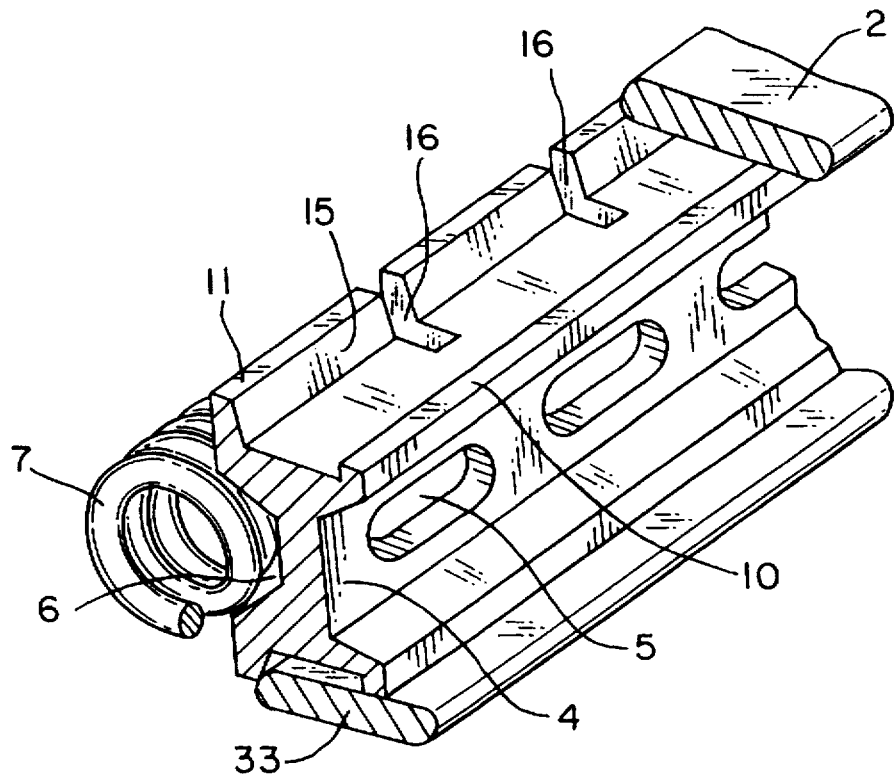
FIG. 8 is a partial sectional view illustrating another modification of the oil scraping ring according to the fourth embodiment.
Figure 9:
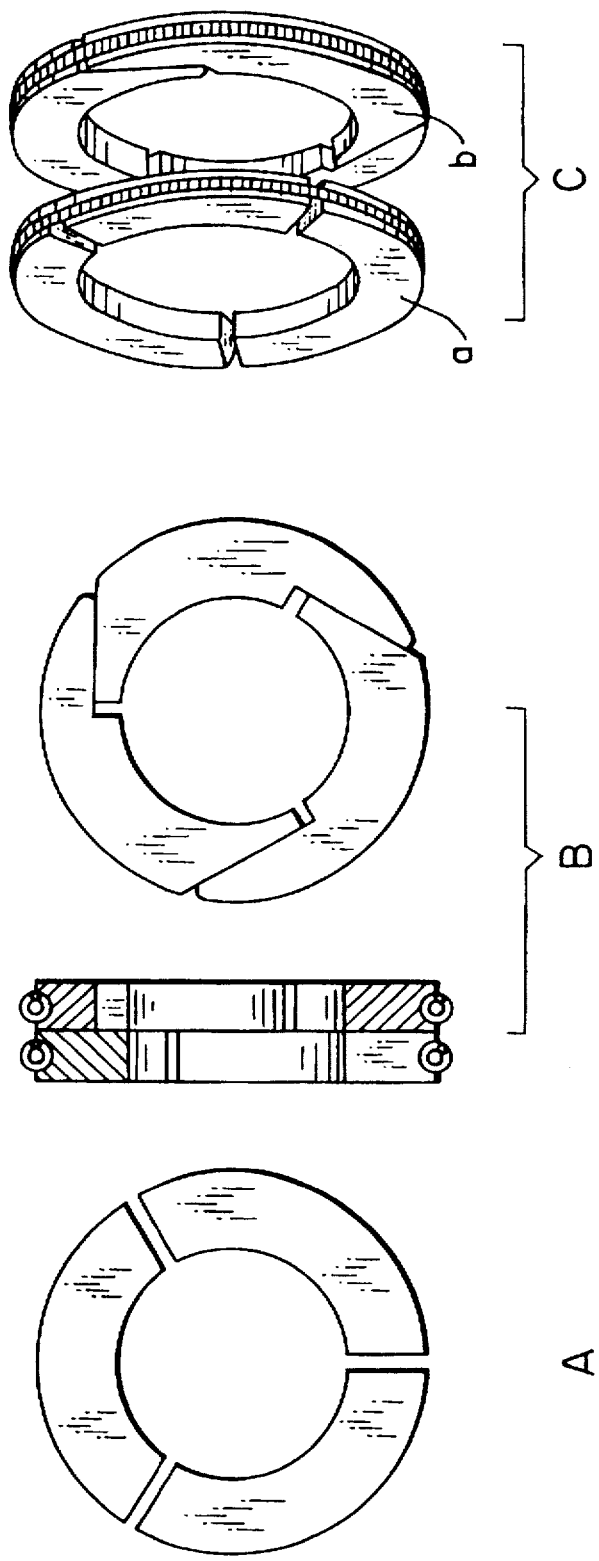
FIGS. 9A, B and C are diagrams illustrating a split oil scraping ring according to the prior art.
Figure 10:
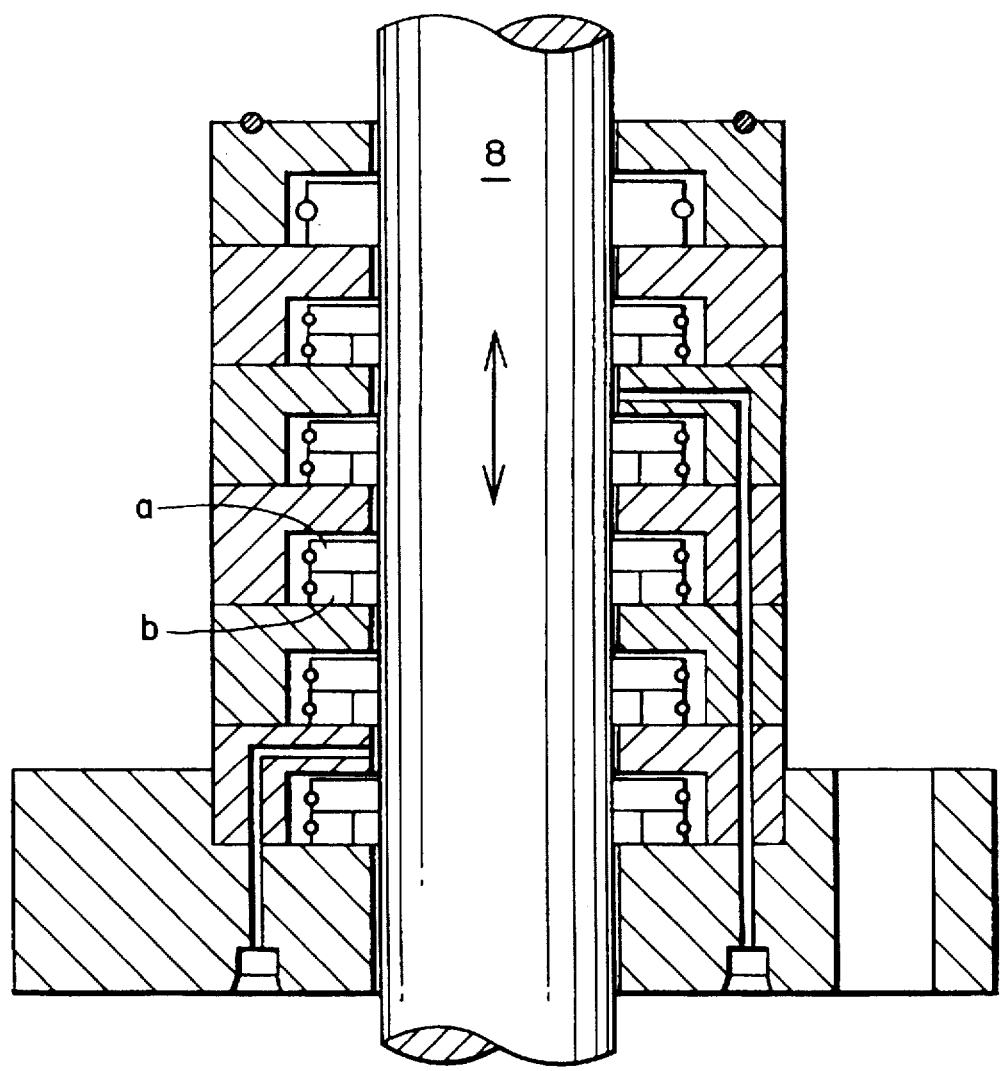
FIG. 10 is a sectional view illustrating the prior-art split oil scraping ring in the installed state.

Further, in the fourth embodiment shown in FIG. 6, the member supporting the side rails, namely the member comprising the strut 4 and the side rail support portions, is formed to have diametrically extending slits 16 spaced apart in the circumferential direction. In a modification of the fourth embodiment shown in FIG. 7, the slits extend diametrically from the inner circumferential side. In another modification of the fourth embodiment shown in FIG. 8, the slits extend diametrically from the outer circumferential side. These slits enhance the flexibility of the member so that the side walls will follow up the outer peripheral surface of the piston rod more faithfully.

Thus, in the piston rod seal device of the present invention, use is made of an oil scraping ring which, by being constructed to have a generally M-, I- or H-shaped cross section, is provided with upper and lower rail members whose inner circumferential edges slide on a piston rod while being brought into pressured contact with the outer peripheral surface thereof by the constraining force of an annular coil spring fitted onto the outer side of the oil scraping ring. As a result, the oil scraping ring follows up the outer peripheral surface of the piston rod in excellent fashion. This means that gaps will not develop between the outer peripheral surface of the piston rod and the inner circumferential edges of the rail members, thus assuring that the seal will be maintained along the entire circumference from an early stage. Accordingly, the occurrence of a phenomenon in which lubricating oil is left without being scraped off is suppressed, thereby reducing consumption of the lubricating oil and the frequency with which parts are replaced. Further, the oil scraping ring used in the present invention exhibits an excellent follow-up characteristic.

Consequently, if the oil scraping ring is fitted onto a piston rod having a cross section which is not a perfect circle and exhibits a low degree of circularity, the oil scraping ring will be capable of following up the outer peripheral surface of the piston rod to remain in excellent contact therewith. This makes it unnecessary to perform correction work, in which the actual parts are fitted together at the factory, and facilitates the operation for replacing parts.

As many apparently widely different embodiments of the present invention can be made without departing from the spirit and scope thereof, it is to be understood that the invention is not limited to the specific embodiments thereof except as defined in the appended claims.

What is claimed is:

1. A seal device for an engine piston rod, said seal device having a combined oil scraping ring which comprises:

an annular oil scraping ring body consisting of a single piece of steel which has been rolled to form an annular shape having a cross-sectional cut at one location and including an upper rail member, a lower rail member and a strut holding said upper and lower rail members above and below and having an annular groove in an outer circumferential side thereof, said annular groove having a number of oil holes spaced apart in the circumferential direction, said oil scraping ring body having a cross section selected from the group consisting of an M-, I- and H-shaped cross section; and an annular coil spring fitted into said annular groove in a stretched state for urging said strut diametrically inward toward the piston rod, whereby inner circumferential edge surfaces of said upper and lower rail members are brought into pressured contact with an outer peripheral surface of the piston rod.

* * * * *